United States Patent [19]

Uhl et al.

[11] Patent Number: 5,219,969
[45] Date of Patent: Jun. 15, 1993

[54] CROSSLINKED COPOLYMERS WITH CROSSLINKABLE GROUPS BASED ON ACRYLIC OR METHACRYLIC ACID, PREPARATION THEREOF AND USE THEREOF

[75] Inventors: Guenter Uhl, Worms; Norbert Grund, Ludwigshafen; Reinhard Schneider, Frankenthal; Ingeborg Schermann, Obertshausen; Manfred Niessner, Schifferstadt; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 904,259

[22] Filed: Jun. 25, 1992

[30] Foreign Application Priority Data

Jul. 12, 1991 [DE] Fed. Rep. of Germany ....... 4123049

[51] Int. Cl.$^5$ .............................................. C08F 20/58
[52] U.S. Cl. ...................................................... 526/304
[58] Field of Search ......................................... 526/304

[56] References Cited

U.S. PATENT DOCUMENTS

| | | |
|---|---|---|
| 4,071,650 | 1/1978 | Gross ................... 526/304 |
| 4,076,928 | 2/1978 | Gross ................... 526/304 |
| 4,190,562 | 2/1980 | Westerman . |
| 4,229,336 | 10/1980 | Sicklesteel et al. ................. 526/304 |
| 4,289,678 | 9/1981 | Calder et al. ....................... 526/304 |
| 4,332,657 | 6/1982 | Makuuchi et al. ................. 526/304 |
| 4,395,524 | 7/1983 | Emmons et al. .................... 526/304 |
| 4,892,916 | 1/1990 | Hawe et al. ........................ 526/304 |
| 4,933,390 | 6/1990 | Dabi et al. ......................... 526/304 |
| 5,104,951 | 4/1992 | Seelmann-Eggebert et al. ... 526/304 |

FOREIGN PATENT DOCUMENTS

| | | |
|---|---|---|
| 0209029 | 11/1988 | European Pat. Off. . |
| 0383057 | 8/1990 | European Pat. Off. . |
| 1257736 | 7/1968 | Fed. Rep. of Germany . |
| 3529530 | 2/1987 | Fed. Rep. of Germany . |
| 3641700 | 6/1987 | Fed. Rep. of Germany . |
| 38-21477 | 10/1963 | Japan ................................. 526/304 |
| 47-27492 | 7/1972 | Japan ................................. 526/304 |
| 56-59803 | 5/1981 | Japan ................................. 526/304 |
| 63-241007 | 10/1988 | Japan ................................. 526/304 |
| 947610 | 1/1964 | United Kingdom ................ 526/304 |
| 1206711 | 9/1970 | United Kingdom ................ 526/304 |
| 2017159 | 10/1979 | United Kingdom . |

*Primary Examiner*—Joseph L. Schofer
*Assistant Examiner*—N. Sarofim
*Attorney, Agent, or Firm*—Oblon, Spivak, McClelland, Maier & Neustadt

[57] ABSTRACT

Abstract of the Disclosure: Crosslinked acrylic or methacrylic acid copolymers with crosslinkable groups that are useful as thickeners for textile print pastes are obtainable by copolymerization of (a) from 50 to 99 parts by weight of acrylic acid and/or methacrylic acid,
(b) from 1 to 50 parts by weight of at least one N-methylol (meth)acrylamide or derivatives thereof,
(c) from 50 to 10,000 ppm, based on the monomers (a) and (b), of an at least bifunctional crosslinker, and
(d) from 0 to 49 parts by weight of other monoethylenically unsaturated monomers in the presence of a free radical polymerization initiator in the aqueous phase of a water-in-oil emulsion.

11 Claims, No Drawings

CROSSLINKED COPOLYMERS WITH CROSSLINKABLE GROUPS BASED ON ACRYLIC OR METHACRYLIC ACID, PREPARATION THEREOF AND USE THEREOF

The present invention relates to crosslinked copolymers which have crosslinkable groups based on acrylic acid or methacrylic acid and which are obtainable by polymerizing acrylic acid and/or methacrylic acid with at least one crosslinkable monoethylenically unsaturated compound in the presence of from 50 to 1,000 ppm, based on the monomers, of an at least bifunctional crosslinker with or without other monoethylenically unsaturated monomers in the presence of a free radical polymerization initiator, the preparation of the copolymers by polymerizing the monomers in the aqueous phase of a water-in-oil emulsion, and the use of the copolymers as thickeners for textile print pastes.

To prepare print pastes for textile printing with pigments it is essential to use thickeners and binders as assistants. The fastness properties of the prints are chiefly determined by the quality of the binder used in the print paste. Especially on synthetic fibers, on regenerated cellulose and on blends of these fibers with cellulose fibers, existing binders do not give wholly adequate fastness properties. To obtain satisfactory fastness properties nonetheless, it was hitherto customary to add a further assistant for the pigment print pastes as external fixing aid. Products of this kind are described for example in Ullmanns Enzyklopädie der technischen Chemie, 4th Edition, Volume 22, pages 629 to 630 (1982), and Volume 23, page 68 (1983). They are usually poly-N-methylol derivatives of melamine, preferably a hexahydroxymethylmelamine which has been etherified with methanol or some other low molecular weight monohydric or dihydric alcohol. The addition of such compounds to pigment print pastes make the recipes more expensive and usually has an adverse effect on the properties of the prints obtainable with these pigment print pastes, since the fabric printed therewith has a harsher fabric hand. Additional disadvantages entailed by the use of these compounds are the high formaldehyde values on the printed fabric.

Binders for pigment print pastes are known for example from DE-B-12 57 736 and EP-A-209 029. The essential feature of these binders is the presence of crosslinkable monomers of the type of N-methylolacrylamide, N-methylolmethacrylamide and/or $C_1$-$C_4$-alcohol-etherified methylol compounds. Binders which do not contain these crosslinkable monomers, as described for example in DE-A-35 29 530, lead to prints having poor crock and wash fastness properties. This disadvantage can be corrected in part by using distinctly increased amounts of an external fixing or crosslinking aid. This accentuates the abovementioned disadvantages of this type of product to a particular degree.

Thickeners which are stable to salts are described in GB-A-2 017 159. They are used in textile printing and consist essentially of nonionic, crosslinked copolymers of acrylamide, methacrylamide or N-vinylpyrrolidone. EP-A-0 383 057 discloses thickeners for textile printing which are prepared by water-in-oil emulsion polymerization of olefinically unsaturated carboxylic acids with olefinically unsaturated nitriles in the presence of crosslinking agents. DE-B-36 41 700 discloses a process for preparing water-in-oil emulsions of cross-linked, water-swellable polymers by polymerizing water-soluble ethylenically unsaturated monomers using from 100 to 5,000 ppm, based on the monomer mixture, of an at least bifunctional crosslinker in the aqueous phase of a water-in-oil emulsion in the presence of a water-in-oil emulsifier and in the additional presence of a wetting agent having an HLB value of at least 10 while using water-soluble polymerization initiators. The water-in-oil emulsions thus obtainable are used as thickeners for textile print pastes. The fastness properties of prints on textiles prepared using textile print paste containing a known thickener are still in need of improvement. To obtain adequate fastness properties on the printed textiles when using these thickeners in print pastes it is necessary, as mentioned earlier, to use an external crosslinking aid. However, this has an adverse effect on the fabric hand of the printed textiles, and the prints obtained have high formaldehyde values.

It is an object of the present invention to make novel substances available. It is a further object of the present invention to make available an improved thickener for textile printing.

We have found that these objects are achieved according to the present invention by crosslinked copolymers based on acrylic acid or methacrylic acid which are obtainable by copolymerization of (a) from 50 to 99 parts by weight of acrylic acid and/or methacrylic acid, (b) from 1 to 50 parts by weight of at least one compound of the formula

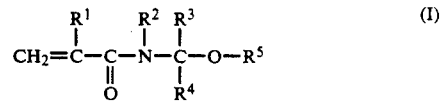

wherein
$R^1$ = H, $CH_3$,
$R^2$ = H, $CH_3$,

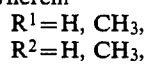

$R^3$, $R^4$ = H, $CH_3$, OH, O—$R^5$, COOH,
$R^5$ = H, $C_1$-$C_8$-alkyl, —$CH_2$—COOH, —($CH_2$—$CH_2$—O)$_n$—H,

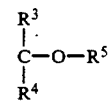

and
n = 1-20, (C) from 50 to 10,000 ppm, based on the monomers (a) and (b), of an at least bifunctional crosslinker, and (d) from 0 to 49 parts by weight of other monoethylenically unsaturated monomers in the presence of a free radical polymerization initiator. The crosslinked copolymers are advantageously prepared by copolymerizing the monomers (a), (b), (c) and, if used, (d) in the aqueous phase of a water-in-oil emulsion in the presence of at least one water-in-oil emulsifier and at least one free radical polymerization initiator to give a water-in-oil polymer emulsion having an average polymer particle diameter of from 0.1 to 20 μm. The crosslinkable copolymers contain crosslinkable groups in copolymerized form and are used as thickeners for textile print pastes.

The crosslinked copolymers contain as component (a) from 50 to 99, preferably from 70 to 95, parts by weight of acrylic acid, methacrylic acid or mixtures of acrylic acid and methacrylic acid in any desired ratio in copolymerized form.

Component (b) of the crosslinked copolymers comprises compounds of the general formula

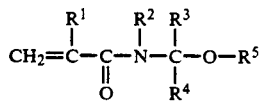

where
$R^1 = H, CH_3$,
$R^2 = H, CH_3$,

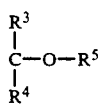

$R^3, R^4 = H, CH_3, OH, O-R^5, COOH$,
$R^5 = H, C_1-C_8\text{-alkyl}, -CH_2-COOH, -(CH_2-CH_2-O)_n-H$,

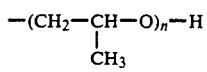

and
n = 1-20.

Suitable monomers of the formula I which are responsible for the crosslinkability of the copolymers are for example N-methylolacrylamide, N-methylolmethacrylamide, N-(methoxymethyl)acrylamide, N-(methoxy-methyl) methacrylamide, N-(ethoxymethyl)methacrylamide, N-(n-propoxymethyl)acrylamide, N-(n-propoxymethyl)methacrylamide, N-(n-butoxymethyl)acrylamide, N-(n-butoxymethyl)methacrylamide and acrylamidohydroxyacetic acid monohydrate. The compounds of component (b) can be used in the copolymerization either alone or mixed. For example, component (b) may comprise a mixture of N-methylolacrylamide and N-methoxymethcrylamide, subjected to copolymerization together with the comonomers of the other groups. The monomers of group (b) are used in the copolymerization in amounts of from 1 to 50, preferably from 5 to 30, parts by weight. Preferred monomers for use as component (b) are N-methylolacrylamide, N-methylolmethacrylamide and the N-methylol(meth)acrylamides which have been partially or completely etherified with monohydric $C_1-C_4$-alcohols.

The copolymers with crosslinkable groups contain as a further essential component from 50 to 10,000, preferably from 300 to 5,000, ppm, based on the monomers (a) and (b), of an at least bifunctional crosslinker. The crosslinkers contain at least two nonconjugated, ethylenically unsaturated double bonds. Suitable crosslinkers are for example N,N'-methylenebisacrylamide, polyethylene glycol diacrylates and polyethylene glycol dimethacrylates, which are each derived from polyethylene glycols of molecular weight 126-8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, doubly or triply acrylated or methacrylated addition products of ethylene oxide and/or propylene oxide with trimethylolpropane, at least doubly acrylated or methacrylated polyhydric alcohols, such as glycerol or pentaerythritol, triallylamine,tetraallylethylenediamine,divinylbenzene, diallyl phthalate, polyethylene glycol divinyl ether, trimethylolpropane diallyl ether, butanediol divinyl ether, pentaerythritol triallyl ether and/or divinylethyleneurea and/or triallylmonoalkylammonium salts, e.g. triallylmethylammonium chloride. Preference is given to using water-soluble crosslinkers, e.g. N,N'-methylenebisacrylamide, polyethylene glycol diacrylates, polyethylene glycol dimethacrylates, pentaerythritol triallyl ether and/or divinylurea.

The crosslinked copolymers with crosslinkable groups may optionally contain as component (d) other monoethylenically unsaturated monomers as copolymerized units. Particular preference is given to using as monomers of component (d) water-soluble monoethylenically unsaturated compounds, e.g. 2-acrylamido-2-methylpropanesulfonic acid, styrenesulfonic acid, vinylsulfonic acid, 2-sulfoethyl methacrylate, styrenephosphonic acid, vinylphosphonic acid, itaconic acid, maleic acid, fumaric acid, acrylamide, methacrylamide, N-vinylpyrrolidone, N-vinylformamide, N-vinylimidazole, N-vinylimidazoline, 2-methyl-1-vinylimidazoline and acrylonitrile. If monomers of group (d) are used in the copolymerization, they are used in amounts of up to 49, preferably up to 25, parts by weight.

As suitable free radical polymerization initiators it is possible to use any customary polymerization initiator. Preference is given to water-soluble initiators, such as alkali metal or ammonium peroxodisulfates, hydrogen peroxide, diacetyl peroxydicarbonate, dicyclohexyl peroxydicarbonate, tert-butyl perpivalate, dilauroyl peroxide, dibenzoyl peroxide, tert-butyl per-2-ethylhexanoate, tert-butyl permaleate, bis(tert-butylperoxy)cyclohexane, tert-butyl peracetate, dicumyl peroxide, di-tert-amyl peroxide, di-tert-butyl peroxide, cumyl hydroperoxide, tert-butyl hydroperoxide and p-menthane hydroperoxide, and also azo initiators, such as 2,2'-azobis(2-methyl-N-phenylpropionamidine) dihydrochloride, 2,2'-azobis(2,4-dimethylvaleronitrile), 2,2-azobis(isobutyronitrile), 2,2'-azobis (2amidinopropane) dihydrochloride and 2,2'-azobis[2-(2-imidazolin-2-yl)propane] dihydrochloride. Preferred initiators are alkali metal and ammonium persulfates, tert-butyl perpivalate, tert-butyl per-2-ethylhexanoate, 2,2'-azobis(2,4-dimethylvaleronitrile), 2,2'-azobis (2-amidinopropane) dihydrochloride,azobis(isobutyronitrile) and 2,2'-azobis[2-(2-imidazolin-2-yl)propane] dihydrochloride. It is possible to use either a single initiator or else mixtures of a plurality of initiators. The choice of initiator depends primarily on the temperature at which the polymerization is to be carried out. It is also possible to use additional salts of heavy metals, e.g. copper, cobalt, manganese, iron, nickel and chromium salts, and/or organic compounds, such as benzoin, dimethylaniline, ascorbic acid and also reducing agents, for example alkali metal disulfite or sodium formaldehydesulfoxylate, together with at least one of the abovementioned free radical polymerization initiators. Such mixtures of initiators make it possible to polymerize at low temperatures. The reducing component of redox initiators can be for example sodium sulfite, sodium bisulfite, sodium formaldehydesulfoxylate or hydrazine. Based on the monomers used in the polymerization, from 100 to 10,000, preferably from 100 to 2,000, ppm of a polymerization initiator or a mixture of a plurality of polymerization initiators are required. The indicated initiator amounts correspond to about 0.003–0.3 mol % of initiator, based on the monomers used.

The monomers of components (a), (b), (c) and, if used, (d) can be polymerized according to any known method. However, preference is given to those methods where the monomers mentioned are polymerized in the aqueous phase of a water-in-oil emulsion in the presence of at least one water-in-oil emulsifier and at least one free radical polymerization initiator. Particular preference is given to a water-in-oil polymerization which gives a water-in-oil polymer emulsion having an average polymer particle diameter of from 0.1 to 20 μm. The aqueous monomer solution for polymerization has a monomer concentration of from 20 to 80, preferably from 30 to 60, % by weight. In the preferred polymerization process, the aqueous solution is emulsified in a hydrophobic liquid (oil phase) to form a water-in-oil emulsion and then polymerized in the presence of one or more polymerization initiators which form free radicals under the polymerization conditions.

As oil phase it is possible to use any inert hydrophobic liquid which is practically insoluble in water and does not noticeably interfere with the polymerization. Preference is given to using aliphatic or aromatic hydrocarbons or mixtures of hydrocarbons. Suitable aliphatic hydrocarbons are linear, branched and cyclic alkanes or mixtures thereof, for example pentane, hexane, heptane, octane, nonane, decane, cyclodecane, decalin, methylcyclohexane, isooctane and ethylcyclohexane. Aromatic hydrocarbons which are suitable for use as hydrophobic liquid are for example toluene, xylene and isopropylbenzene. In addition it is of course also possible to use halogenated hydrocarbons, such as tetrachloroethane, hexachloroethane, trichloroethane and chlorobenzene. The boiling range of usable hydrocarbons is wide, extending from 50° to 350° C. The oil phase amounts to 15–70, preferably 20–50, % by weight of the water-in-oil emulsion.

The aqueous monomer solution is dispersed in the oil phase using water-in-oil emulsifiers known for this purpose. These emulsifiers are for example sorbitan esters, such as sorbitan monostearate, sorbitan monooleate, sorbitan palmitate and sorbitan laurate, and also glycerol esters whose acid component is derived from $C_{14}$–$C_{20}$-carboxylic acids. Further suitable emulsifiers are the water-in-oil emulsifiers disclosed in DE-C-2 557 324, which are obtainable by A) reacting $C_{10}$–$C_{22}$-fatty alcohols with epichlorohydrin in a molar ratio of 1:0.5 to 1:1.5 to form glycidyl ethers, B) reacting the glycidyl ethers with (1) saturated $C_2$–$C_6$-alcohols containing from 2 to 6 OH groups, or (2) monoethers thereof with $C_{10}$–$C_{22}$-fatty alcohols in a molar ratio of glycidyl ether:(1) or (2) of from 1:0.5 to 1:6 in the presence of acids or bases, and C) alkoxylating the reaction product of (B) with at least one $C_2$–$C_4$-alkylene oxide in a molar ratio of from 1:1 to 1:6.

Suitable water-in-oil emulsifiers have an HLB value of not more than 8. The HLB value represents the hydrophilic-lipophilic balance of the emulsifier; cf. W. C. Griffin, J. Soc. Cosmet. Chem. 1 (1949), 311. The water-in-oil emulsifiers are used in an amount of from 2 to 20, preferably from 5 to 15, % by weight, based on the monomers used. Preference is given to using those water-in-oil emulsifiers which are described in the above-cited reference DE-C-2 557 324.

In a preferred embodiment of the present invention, the copolymerization of the water-soluble monomers is carried out in the additional presence of at least one oil-in-water emulsifier. The use of this type of emulsifier makes it possible to prepare particularly finely divided and stable water-in-oil polymer emulsions. Suitable oil-in-water emulsifiers are for example all wetting agents which have an HLB value of at least 10. Essentially these emulsifiers are hydrophilic water-soluble compounds, such as ethoxylated alkylphenols or ethoxylated fatty alcohols. Products of this kind are obtained for example when $C_8$–$C_{12}$-alkylphenols or $C_8$–$C_{22}$-fatty alcohols are reacted with ethylene oxide with or without propylene oxide and/or butylene oxide. Preference is given to ethoxylating $C_{12}$–$C_{18}$-fatty alcohols. The molar ratio of alkylphenol or fatty alcohol to ethylene oxide in the ethoxylation is in general within the range from 1:5 to 1:20. Further suitable emulsifiers are for example alkoxylated fatty amines. If emulsifiers having an HLB value of 10 or higher are used in the polymerization, the amounts employed range from 1 to 20, preferably from 2 to 15, % by weight, based on the monomers to be polymerized.

The pH of the aqueous monomer solution to be polymerized may, if desired, be raised by adding a base. The pH of the aqueous monomer solutions can range from 3 to 13, but preferably it is in the range from 6 to 11.5. If a base is to be added for neutralization, it is preferable to use an alkali metal base, such as sodium hydroxide or potassium hydroxide solution, ammonia or an amine, e.g. methylamine, dimethylamine, trimethylamine, ethanolamine, diethanolamine, triethanolamine or morpholine. However, the acid groups of the monomers to be polymerized may also be neutralized or partially neutralized with the aid of aqueous sodium carbonate solution or by the addition of sodium bicarbonate, potassium carbonate or ammonium carbonate.

The polymerization is customarily carried out within the temperature range from 10° C. to 80° C. The choice of temperature is highly dependent on the choice of initiator. Uniform, stable, coagulum-free water-in-oil emulsion copolymers are obtained. The average size of the polymer particles is within the range from 0.1 to 20, preferably from 0.5 to 10, μm. The water-in-oil emulsion copolymers obtainable in the course of the polymerization can be used directly or they are isolated from the water-in-oil polymer emulsion by known methods, for example by precipitating with alcohols, by the method described in DE-A-39 26 120, or by dehydrating the water-in-oil polymer emulsion in the presence of from 1 to 20% by weight, based on the polymer, of agglomerating polyalkylene glycols by azeotropic distillation with agglomeration of the primary particles of the polymer emulsion and isolating the agglomerated polymer particles. Agglomerating polyalkylene glycols are for example addition products of $C_2$–$C_4$-alkylene oxides with alcohols, phenols, amines or carboxylic acids that contain at least 2 alkylene oxide units in copolymerized form. The agglomerated polymer particles of the water-in-oil polymer emulsion are for example filtered or centrifuged off and freed of adherent solvent.

The copolymers according to the present invention are crosslinked owing to the presence of monomers of component (c) in copolymerized form, and contain cross-linkable groups owing to the presence of monomers of components (b) in copolymerized form. If the copolymers according to the present invention are heated to more than 80° C., preferably 120°-150° C., the copolymerized units of monomers of group (b) present in the copolymer react and lead to a further crosslinking of the copolymers or to a reaction of the copolymers with other reactants, for example the hydroxyl groups of textiles made of cellulose, when the compounds according to the present invention are used as thickeners in pigment print pastes. The copolymers according to the present invention are universally applicable as thickeners for aqueous systems and are preferably used as thickeners for textile print pastes. Per 1,000 parts by weight of the textile print paste it is necessary to use about 5-50 parts by weight of a water-swellable copolymer according to the present invention which is crosslinked and, owing to the presence of copolymerized units of monomers (b), yet further crosslinkable. The thickening action of the copolymers according to the present invention occurs immediately on mixing the copolymers or the water-in-oil copolymer emulsions with the other constituents of the textile print paste. The maximum thickening effect of the copolymers according to the present invention is obtained within the textile print paste pH range from 5.0 to 10.0. This pH can be set by adding sodium hydroxide solution or potassium hydroxide solution or ammonia or amines to the print paste. If, however, completely or partially neutralized carboxylic acids were already used in the copolymerization, the maximum thickening effect can also be obtained without further neutralization. The particle size of the copolymers which according to the present invention are used as thickeners for textile print pastes is preferably below 5 μm.

Used as thickeners, the copolymers according to the present invention are high yielding and give structureless and residue-free print pastes. In addition to the thickeners to be used according to the present invention, the print pastes contain dyes or pigments with or without further customary printing assistants, for example the fixing agents required for the particular class of dye or, if appropriate, binders for pigments. Textile print pastes which contain the copolymers according to the present invention as thickeners can be used for printing any natural or synthetic fiber materials, in particular sheetlike fiber materials, such as wovens, knits, tapes, nonwovens and paper, the printed paper also being suitable for transfer printing with pigment and disperse dyes. The fiber materials can consist of cellulose, regenerated cellulose, wool, silk, polyester, such as polyethylene terephthalate, polyamide, such as poly-e-caprolactam, acid modified polyesters and polyamides, polyacrylonitrile, polycarbonates, polyolefins or polyurethanes or contain these fibers in a blend with other fibers. The particular class of dye to be used depends on the fiber type in question. Possible dyes are for example pigment, disperse, vat, acid, metal complex or reactive dyes. Examples of dyes are described in the Colour Index, 3rd Edition, 1971, Volume 4.

The customary assistants which, if appropriate, may be added to the print pastes can be for example hydrotropic agents, such as urea, glycols or glycol ethers, and bases, such as ammonia, sodium carbonate or potassium carbonate or sodium bicarbonate, sodium hydroxide solution, potassium hydroxide solution or alkali donors, e.g. sodium trichloroacetate. Further assistants are for example tartaric acid, citric acid and lactic acid or acid donors, such as diammonium phosphate. The print pastes may also contain surface-active substances or emulsifiers, such as nonionic reaction products of alkylene oxides with phenols or fatty alcohols, and also anionic compounds. In the case of pigment print pastes, the customary assistants also include customary binders. Suitable binders are for example crosslinkable dispersions based on styrene and acrylic esters which can contain N-methylol(meth)acrylamide or the corresponding etherified compounds as crosslinkable monomers, and also dispersions based on styrene-butadiene latices, which may likewise contain N-methylol compounds or the correspondingly etherified N-methylol compounds. However, as binders it is also possible to use dispersions which do not contain any self-crosslinking monomers, as described for example in DE-A-35 29 530. Other customary assistants for print pastes are for example defoamers or assistants which improve the hand of the printed material.

The print paste is applied using customary textile printing machines, for example flat screen, roller, and rotary screen printing machines.

If the copolymers according to the present invention are used in textile print pastes it is possible to dispense with the otherwise customary external fixing aid (for example methanol-etherified hexahydroxymethylolmelamine). This gives textile prints which split off significantly less formaldehyde than textile prints which contain an external crosslinking aid. Further important advantages associated with the use of the copolymers according to the present invention as thickeners in print pastes are that the fabric hand of the prints is softer and that the prints are highly crock-resistant, wash-resistant, solvent-resistant, clear, resilient, nontacky and light-resistant. The prints are particularly sharp, level, strong in color and brilliant.

The textile prints are assessed according to known technical criteria, the most important of which will now be briefly described.

Crock fastness properties

The dry and wet crock fastness properties are determined according to DIN 54 021. A piece of white fabric is clamped into a crockmeter and rubbed ten times. The intensity of staining of the fabric is rated on a 5point scale ranging from 1 as the worst and 5 as the best rating. A rating of 1 indicates very pronounced crocking, while a rating of 5 indicates only minimal crocking.

Wash fastness properties

The print is subjected to five washing machine washes at 60° C. with a commercial heavy duty detergent. The result is assessed on an internal five-point scale ranging from 1 as the worst to 5 as the best rating. A rating of 1 indicates a pronounced loss of color strength compared with the unwashed material, while a rating of 5 indicates only minimal loss.

Brush wash

The test is carried out according to a method described in the brochure "Helizarin ® System im Textildruck", Edition 11.69, page 50 (technical literature from BASF) as Helizarin wash II. First a print is boiled in a weakly alkaline washing liquor and then brushed a total of 50 times with a Perlon brush. The result is assessed on an internal 5-point scale, ranging from 1, which indicates pronounced rubbing off, to 5, which indicates only very minimal rubbing off.

Formaldehyde determinations

Formaldehyde is determined according to each of the known methods of Law 112, AATCC-112 and Shirley I (see for example F. Reinert "Neuester Stand der Vernetzer fur die Pflegeleichtausrüstung von cellulosehaltigen Textilien" in Textilveredlung, 25 (1990), No. 10, p. 322–327).

In the examples, parts and percentages are by weight. The average particle sizes of the polymers are from scanning electron micrographs. The determination was carried out on dry polymer powders, the water content of the polymers being below 8% by weight. The examples were carried out using inter alia the following substances:

Water-in-oil emulsifier 1
This emulsifier was prepared by
(A) reacting oleyl alcohol with epichlorohydrin in a molar ratio of 1:1 to give oleyl glycidyl ether,
(B) reacting the oleyl glycidyl ether with glycerol in a molar ratio of 1:1 in the presence of $BF_3$-phosphoric acid at 80° C. and removing the catalyst with the aid of a basic ion exchanger, and
(C) ethoxylating the product of (B) with 2 mol of ethylene oxide.

The preparation of emulsifiers of this type is known for example from DE-C-25 57 324.

Oil-in-water emulsifier 1
This emulsifier is the addition product of 8 mol of ethylene oxide with 1 mol of nonylphenol and has an HLB value of 12.5 as defined by W. C. Griffin, J. Soc. Cosmetic Chemists 1 (1949), 311.

EXAMPLES

General Method For Preparing Water-In-Oil Polymer Emulsions

A 2 l capacity polymerization vessel, fitted with horseshoe stirrer, thermometer and nitrogen inlet and outlet, is charged with the aqueous monomer solutions described in the table and the contents are in each case adjusted to pH 8.0 with 25% aqueous ammonia solution. The clear solution is then admixed in each case with 250 g of a hydrocarbon oil having a boiling range of from 192° to 254° C., which is 84% saturated aliphatic hydrocarbon and 16% saturated naphthenic hydrocarbon, 20 g of the above-described water-in-oil emulsifier 1 and 9 g of the above-described oil-in-water emulsifier 1. The polymerizable mixture is then emulsified for 1 hour at room temperature in a slow stream of nitrogen at a stirrer speed of 400 revolutions per minute in the presence of 0.054 g of 2,2'-azobis(2-amidinopropane) dihydrochloride. The stirrer speed is then reduced to 200 revolutions per minute, and the reaction mixture is heated to 55° to 60° C. and polymerized within that temperature range for 1.5 hours. Then 0.054 g of 2,2'-azobis(2amidinopropane) dihydrochloride is added, and the reaction mixture is maintained at 65° C. for a further 2 hours to polymerize residual monomer. Every case produces a gel-free, stable, crosslinkable water-in-oil polymer emulsion which already contains crosslinked polymer particles and whose polymer particles have an average diameter of from 0.5 to 3 μm.

TABLE

| Example | Composition of aqueous monomer solution | | | | | | | | |
|---|---|---|---|---|---|---|---|---|---|
| | 1 | 2 | 3 | 4 | 5 | 6 | 7 | 8 | 9 |
| Distilled water | 186 | — | 186 | 180 | 236 | 286 | 236 | 68 | 178 |
| Acrylic acid | 180 | 200 | 200 | 180 | 200 | 150 | 200 | 200 | 200 |
| Acrylamide solution, 50% | 50 | — | — | 50 | — | — | — | — | 25 |
| Acrylamidohydroxyacetic acid monohydrate | 50 | — | — | 50 | — | — | — | — | — |
| N-Methylolacrylamide, 48% | — | — | — | — | 50 | 100 | 100 | — | — |
| N-Methylolmethacrylamide, 15% | — | 335 | — | — | — | — | — | 269 | 134 |
| N-(a-Butoxymethyl)acrylamide | — | — | 100 | — | — | — | — | — | — |
| N,N-Methylenebisacrylamide, 1% solution | 20 | 18 | 18 | 20 | 18 | 18 | 18 | 18 | 18 |
| Formic acid | 0.42 | 0.37 | 0.37 | 0.42 | 0.37 | 0.37 | 0.37 | 0.37 | 0.37 |
| Pentasodium salt of diethylenetriaminepentaacetic acid, 40% solution | 0.18 | 0.18 | 0.18 | 0.18 | 0.18 | 0.18 | 0.18 | 0.18 | 0.18 |

All the quantities in the table are in g. The concentrations given for the starting materials relate to solutions in water.

USE EXAMPLES

Example 10

41 g of the water-in-oil polymer emulsion prepared in Example 7 are stirred into a mixture of 834 g of tap water and 100 g of a commercial binder based on a 40% copolymer dispersion of butyl acrylate, styrene and N-methylolmethacrylamide.

The batch is stirred for four minutes with a high speed stirrer at 10,000 revolutions per minute. Then there are added 5 g of a commercial plasticizer based on a polydimethylsiloxane and 20 g of the blue pigment dye of Colour Index No. 74160, and the batch is stirred for a further minute at 5,000 revolutions per minute.

The print paste obtained is then printed with the aid of a flat screen stencil onto a fabric made of viscose staple. This is followed by drying at 100° C. and fixation at 150° C. with hot air. The result is a strong brilliant blue paint of high levelness, sharp outlines, soft hand, good dry cleaning fastness properties, good dry and wet crock fastness properties and also good wash and brush wash fastness properties. The print is also very low in formaldehyde.

Crock fastness dry: 4
Crock fastness wet: 5
Wash fastness: 4
Brush wash: 4
Formaldehyde values:
Law 112—50 ppm
AATCC-112—138 ppm
Shirley I—29 ppm

Comparative Example 1

Example 10 is repeated, except that the thickener is replaced by 46 g of thickener prepared from acrylic acid, acrylamide and methylenebisacrylamide as described in Example 1 of DE-B-36 41 700. This gives a blue print which, although the formaldehyde values are similarly low, has distinctly worse dry and wet crock fastness properties and also distinctly worse wash and brush wash fastness properties.

Crock fastness dry: 3
Crock fastness wet: 2
Wash fastness: 4
Brush wash: 3
Formaldehyde values:
Law 112—69 ppm
AATCC-112—133 ppm
Shirley I—29 ppm

Comparative Example 2

Comparative Example 1 is repeated, except that 10 g of commercial fixing aid based on hexamethoxymethylmelamine are added. This gives a print which has better wet crock and also better wash and brush wash fastness properties than the print prepared as described in Comparative Example 1 but also a harsher hand and significantly higher formaldehyde values.

The print prepared according to Comparative Example 2 combines significantly higher formaldehyde values with similar wash and brush wash fastness properties as the print prepared as described in Example 10 but has the disadvantage of poorer dry and wet crock fastness properties.

Crock fastness dry: 3
Crock fastness wet: 4
Wash fastness: 4
Brush wash: 4
Formaldehyde values:
Law 112—425 ppm
AATCC-112—1669 ppm
Shirley I—463 ppm

Example 11

42 g of the water-in-oil polymer emulsion prepared as described in Example 2 are stirred into a mixture of
828 g of tap water and
100 g of a commercial binder based on a commercial 45% copolymer dispersion of butyl acrylate, acrylonitrile and hydroxyethyl acrylate that is free of methylol groups.

The batch is stirred with a high speed stirrer at 10,000 revolutions per minute for four minutes. Then there are added
10 g of commercial plasticizer based on a polydimethylsiloxane and also
20 g of the red pigment dye of Colour Index No. 12485, and the batch is stirred for a further minute at 5,000 revolutions per minute.

The print paste obtained is then applied to a fabric composed of a 65/35% polyester-cotton blend with the aid of a flat screen printing stencil. This is followed by drying at 100° C. for 2 minutes and fixing with hot air at 150° C. for 5 minutes. The result is a strong brilliant red print possessing good levelness, sharp contours, a soft fabric hand and good dry and wet crock fastness properties and also good wash, brush wash and dry cleaning fastness properties. The print is very low in formaldehyde.

Crock fastness dry: 3
Crock fastness wet: 4
Wash fastness: 4
Brush wash: 3
Formaldehyde values:
Law 112—3 ppm
AATCC-112—3 ppm
Shirley I—14 ppm The original fabric used for the experiments has in the unprinted, uncrosslinked state the following formaldehyde values:
Law 112—3 ppm
AATCC-112—3 ppm
Shirley I—12 ppm

Comparative Example 3

Example 11 is repeated, except that the thickener is replaced by 46 g of a thickener prepared according to Example 2 of DE-B-36 41 700. A less sharp and less level print is obtained which has similar formaldehyde values but which also has distinctly worse dry and wet crock fastness properties and worse wash and brush wash fastness properties.

Crock fastness dry: 3
Crock fastness wet: 1
Wash fastness: 1
Brush wash: 1
Formaldehyde values:
Law 112—2 ppm
AATCC-112—4 ppm
Shirley I—13 ppm

Comparative Example 4

Comparative Example 3 is repeated, except that 5 g of commercial fixing aid based on a hexamethoxymethylmelamine are used in addition. The print obtained has a similar dry and brush wash fastness as the print prepared in Example 11, but also has the disadvantages of a poorer wet crock and wash fastness, of less sharp contours and poorer levelness and significantly higher formaldehyde values.

Crock fastness dry: 3
Crock fastness wet: 2
Wash fastness: 2
Brush wash: 3
Formaldehyde values:
Law 112—205 ppm
AATCC-112—983 ppm
Shirley I—302 ppm

Example 12

A 2 l capacity plastics beaker is filled with 816 g of tap water. The water is stirred by hand with a wide plastics spatula and
44 g of the water-in-oil polymer emulsion prepared in Example 3 are slowly poured in. The batch starts to thicken within a minute.

It is then stirred with a high speed stirrer at 10,000 revolutions per minute for two minutes. A homogeneous, structureless highly viscous paste is obtained. This is followed by the addition of of urea,
15 g of urea,
120 g of a commercial binder based on a 45% copolymer dispersion of butyl acrylate, styrene and N-methylolmethacrylamide and
20 g of the blue pigment dye of Colour Index No. 74160 and further stirring for one minute at 10,000 revolutions per minute.

The print paste obtained is then applied to a fabric composed of a 65/35% polyester-cotton blend with the aid of a flat screen printing stencil. This is followed by 2 minutes of drying at 100° C. and 5 minutes of fixing with hot air at 150° C. The result obtained is a blue print possessing a soft fabric hand, good levelness, sharp contours and good dry and wet crock fastness properties and also good wash, brush wash and dry cleaning properties. The print is very low in formaldehyde.

Comparative Example 5

Example 12 is repeated, except that the thickener is replaced by 46 g of a thickener prepared as described in Example 2 of DE-B-36 41 700. The print obtained has worse contours and is less level and combines somewhat higher formaldehyde values with poorer dry and wet crock fastness properties and also with distinctly worse wash and brush wash fastness properties.

Comparative Example 6

Comparative Example 5 is repeated, except that 5 g of a commercial fixing aid based on a hexamethoxymethylmelamine are added in addition. The print obtained is, compared with Example 12, less level and somewhat less sharp but has a harsher fabric hand and, for similar fastness properties, distinctly higher formaldehyde values.

EXAMPLE 13

10 g of the copolymer prepared in Example 4 are isolated in the form of a powder by azeotropic dewatering in the presence of 5% of polyethylene glycol of molecular weight 300 and added to 590 g of tap water with stirring.

The batch starts to thicken within a few seconds. It is then stirred for two minutes with a high speed stirrer at 8,000 revolutions per minute. Then, as the homogeneous viscous batch is being stirred at 8,000 revolutions per minute, 250 g of white spirit are emulsified into it in the course of a minute.

This is followed by a further minute of stirring at 1,000 revolutions per minute, at which point 120 g of a commercial binder based on a 45% copolymer dispersion of butadiene, styrene, acrylonitrile and N-methylolmethacrylamide and also parts of the red pigment dye of Colour Index No. 12475 are added.

The mixture is further stirred at 10,000 revolutions per minute for two minutes.

The print paste obtained is then applied to a cotton fabric with the aid of a roller printing machine. The print is dried at 100° C. for 3 minutes and fixed with hot air at 150° C. for 5 minutes. The result is a brilliant, strong, level, sharp red print having good dry and wet crock fastness properties and also good wash, brush wash and dry cleaning fastness properties and a low formaldehyde content.

Example 14

42 g of the water-in-oil polymer emulsion prepared in Example 5 are added with stirring to
768 g of tap water. This is followed by
150 g of commercial binder based on a 40% copolymer dispersion of butyl acrylate, acrylonitrile, styrene and N-methylolmethacrylamide,
10 g of a commercial plasticizer based on a polydimethylsiloxane and also
30 g of the red pigment dye of Colour Index No. 12485.

The mixture is then stirred at 10,000 revolutions per minute for 3 minutes. The homogeneous print paste obtained is then applied to a cotton fabric with the aid of a flat screen printing machine. This is followed by drying at 100° C. for 3 minutes and fixing at 155° C with hot air for 5 minutes. The result is a brilliant, strong, very level, sharp, soft formaldehyde-free red print having particularly good dry and wet crock fastness properties and also good wash, brush wash and dry cleaning fastness properties.

Example 15

Example 14 is repeated, except that the thickener is replaced by 51 g of the water-in-oil polymer emulsion prepared in Example 6. The print is fixed at 155° C. with hot air. The result is a brilliant, strong, very level, sharp, soft low-formaldehyde red print having particularly good dry and wet crock fastness properties and also good wash, brush wash and dry cleaning fastness properties.

Example 16

Example 14 is repeated, except that the thickener is replaced by 47 g of the water-in-oil polymer emulsion prepared in Example 2. The properties of the print are similar to those of Example 14.

Example 17

Example 14 is repeated, except that the thickener is replaced by 48 g of the water-in-oil polymer emulsion prepared in Example 8. The properties of the print are similar to those of Example 14.

Example 18

Example 14 is repeated, except that the thickener is replaced by 42 g of the water-in-oil polymer emulsion prepared in Example 8 and 15 g of urea or ethyleneurea are used. The result obtained is a brilliant, strong, very level, sharp, soft, very low-formaldehyde red print having good dry and wet crock fastness properties and also good wash, brush wash and dry cleaning fastness properties.

We claim:
1. A crosslinked copolymer based on acrylic acid or methacrylic acid, obtained by copolymerization of
(a) from 50 to 99 parts by weight of acrylic acid or methacrylic acid,
(b) from 1 to 50 parts by weight of at least one compound of the formula

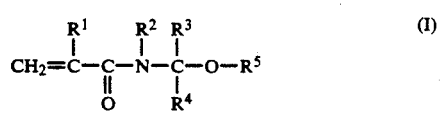

(I)

wherein
$R^1 =$ H, CH$_3$,
$R^2 =$ H, CH$_3$,

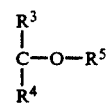

R³, R⁴=H, CH₃, OH, O—R⁵, COOH,
R⁵=H, C₁-C₈-alkyl, —CH₂—COOH, —(CH₂—CH₂—O)ₙ—H,
n=1-20,
(c) from 50 to 10,000 ppm, based on the monomers (a) and (b), of an at least bifunctional crosslinker, and
(d) from 0 to 49 parts by weight of other monoethylenically unsaturated monomers
in the presence of a free radical polymerization initiator.

2. A crosslinked copolymer as claimed in claim 1, wherein (c) is N,N'-methylenebisacrylamide, polyethylene glycol diacrylates and polyethylene glycol dimethacrylates, which are each derived from polyethylene glycols of molecular weight 126–8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymer of ethylene oxide and propylene oxide, doubly or triply acrylated or methacrylated addition products of ethylene oxide and/or propylene oxide with trimethylolpropane, at least doubly acrylated or methacrylated polyhydric alcohols, triallylamine, tetraallylethylenediamine, divinylbenzene, diallyl phthalate, polyethylene glycol divinyl ether, trimethylolpropane diallyl ether, butanediol divinyl ether, pentaerythritol triallyl ether and/or divinylethyleneurea and/or triallylmonoalkylammonium salts.

3. A crosslinked copolymer as claimed in claim 3, wherein (c) is N,N'-methylenebisacrylamide, polyethylene glycol diacrylates, polyethylene glycol dimethacrylates, pentaerythritol triallyl ether and/or divinylurea.

4. A crosslinked copolymer as claimed in claim 1, wherein (d) is 2-acrylamido-2-methylpropane-sulfonic acid, styrenesulfonic acid, vinylsulfonic acid, 2-sulfoethyl methacrylate, styrenephosphonic acid, vinylphosphonic acid, itaconic acid, maleic acid, fumaric acid, acrylamide, methacrylamide, N-vinylpyrrolidone, N-vinylformamide, N-vinylimidazole, N-vinylimidazoline, 2-methyl -1-vinylimidazoline or acrylonitrile.

5. A crosslinked copolymer as claimed in claim 2, wherein (d) is 2-acrylamido-2-methylpropane-sulfonic acid, styrenesulfonic acid, vinylsulfonic acid, 2-sulfoethyl methacrylate, styrenephosphonic acid, vinylphosphonic acid, itaconic acid, maleic acid, fumaric acid, acrylamide, methacrylamide, N-vinylpyrrolidone, N-vinylformamide, N-vinylimidazole, N-vinylimidazoline, 2-methyl -1-vinylimidazoline or acrylonitrile.

6. A crosslinked copolymer as claimed in claim 1, obtained by the copolymerization of acrylic acid, acrylamide, acrylamidohydroxyacetic acid and N,N-methylene-bisacrylamide.

7. A crosslinked copolymer as claimed in claim 1 obtained by the copolymerization of acrylic acid, N-methylolacrylamide and N,N-methylene-bisacrylamide.

8. A crosslinked copolymer as claimed in claim 1, obtained by the copolymerization of acrylic acid, N-(n-butoxy) methacrylamide and N,N-methylenebisacrylamide.

9. A crosslinked copolymer as claimed in claim 1, obtained by the copolymerization of acrylic acid, acrylamide, acrylamidohydroxyacetic acid and N,N-methylenebisacrylamide.

10. A crosslinked copolymer as claimed in claim 1, obtained by the copolymerization of acrylic acid, N-methylolacrylamide and N,N-methylene-bis-acrylamide.

11. A crosslinked copolymer as claimed in claim 1, obtained by the copolymerization of acrylic acid, acrylamide, N-methylolacrylamide and N,N-methylenebisacrylamide.

* * * * *